(12) United States Patent
Yang et al.

(10) Patent No.: US 9,325,941 B2
(45) Date of Patent: Apr. 26, 2016

(54) COMMUNICATION CHANNEL MANAGEMENT FOR REAL-TIME APPLICATIONS

(71) Applicant: Apple Inc., Cupertino, CA (US)

(72) Inventors: Yan Yang, San Jose, CA (US); Hyeonkuk Jeong, Saratoga, CA (US); Ming Jin, Saratoga, CA (US); Joe S. Abuan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/338,742

(22) Filed: Jul. 23, 2014

(65) Prior Publication Data

US 2015/0350599 A1 Dec. 3, 2015

Related U.S. Application Data

(60) Provisional application No. 62/005,598, filed on May 30, 2014.

(51) Int. Cl.
| | | |
|---|---|---|
| *H04N 7/15* | (2006.01) | |
| *H04W 24/08* | (2009.01) | |
| *H04W 72/08* | (2009.01) | |
| *H04L 29/06* | (2006.01) | |
| *H04W 84/04* | (2009.01) | |

(52) U.S. Cl.
CPC .............. *H04N 7/15* (2013.01); *H04L 65/1083* (2013.01); *H04L 65/80* (2013.01); *H04W 24/08* (2013.01); *H04W 72/085* (2013.01); *H04W 84/045* (2013.01)

(58) Field of Classification Search
CPC ... H04L 65/1083; H04L 65/80; H04W 24/08; H04W 72/085

USPC .................. 370/328, 329, 342, 252; 375/295; 455/412.1, 414.1, 417, 418, 436, 458, 455/63.3; 725/40; 348/14.02, 14.12; 379/265.01; 709/235; 711/104
See application file for complete search history.

(56) References Cited

U.S. PATENT DOCUMENTS

| | | | | |
|---|---|---|---|---|
| 5,815,816 | A * | 9/1998 | Isumi .................... | H04Q 3/0062 455/445 |
| 6,526,036 | B1 * | 2/2003 | Uchida .................... | H04J 13/00 370/320 |
| 6,920,121 | B2 * | 7/2005 | Tan ........................ | H04W 72/10 370/329 |
| 7,912,454 | B2 * | 3/2011 | Vemuri .................. | H04L 65/604 455/412.1 |
| 8,000,689 | B2 * | 8/2011 | Featherstone ........... | H04W 4/02 370/328 |
| 8,171,157 | B2 * | 5/2012 | Khan .................. | H04L 47/2416 709/235 |
| 8,576,735 | B2 * | 11/2013 | Yahagi ............... | H04N 7/17336 370/252 |
| 8,744,000 | B2 * | 6/2014 | Zhao .................... | H04B 7/0689 370/328 |

(Continued)

*Primary Examiner* — Gerald Gauthier
(74) *Attorney, Agent, or Firm* — Meyertons Hood Kivlin Kowert & Goetzel, P.C.; Jeffrey C. Hood; Joel L. Stevens

(57) ABSTRACT

Conducting a real time application between a mobile device and a remote device. A first one or more messages may be transmitted to the remote device to establish a primary channel of communication for the real-time application. The primary channel may use a first radio access technology (RAT), such as WiFi or a cellular RAT. A second one or more messages may be transmitted to the remote device to establish a secondary channel of communication for the real-time application. The secondary channel may use a second RAT that is different from the first RAT. Data of the real-time application may be transmitted over both the primary channel and the secondary channel in a concurrent or redundant fashion.

19 Claims, 12 Drawing Sheets

(56) References Cited

U.S. PATENT DOCUMENTS

| | | | |
|---|---|---|---|
| 8,805,375 B2 * | 8/2014 | Periyalwar | H04W 76/026 370/328 |
| 8,897,753 B2 * | 11/2014 | Salkintzis | H04L 65/601 370/328 |
| 8,917,311 B1 * | 12/2014 | Yang | H04L 65/1069 348/14.01 |
| 8,942,686 B2 * | 1/2015 | Wright | H04M 3/42068 370/328 |
| 8,971,243 B2 * | 3/2015 | De Pasquale | H04B 7/022 370/328 |
| 8,989,366 B1 * | 3/2015 | Moore | H04M 3/5158 379/265.01 |
| 2011/0075605 A1 | 3/2011 | De Pasquale et al. | |
| 2013/0095806 A1 | 4/2013 | Salkintzis et al. | |
| 2013/0237226 A1 | 9/2013 | Periyalwar et al. | |
| 2014/0068165 A1 * | 3/2014 | DeCorte | G06F 9/544 711/104 |
| 2014/0282729 A1 * | 9/2014 | Stern | H04N 21/4722 725/40 |
| 2015/0140986 A1 * | 5/2015 | Lamb | H04W 8/06 455/418 |
| 2015/0172946 A1 * | 6/2015 | Lee | H04W 24/10 455/67.11 |
| 2015/0215987 A1 * | 7/2015 | Kim | H04W 76/04 370/329 |
| 2015/0350290 A1 * | 12/2015 | Yang | H04L 65/80 348/14.02 |
| 2015/0350598 A1 * | 12/2015 | Yang | H04N 7/15 348/14.02 |
| 2015/0350599 A1 * | 12/2015 | Yang | H04N 7/15 348/14.02 |

* cited by examiner

COMMUNICATION CHANNEL MANAGEMENT FOR REAL-TIME APPLICATIONS

PRIORITY INFORMATION

The present application claims benefit of priority to provisional patent application No. 62/005,598, entitled "Communication Channel Management for Real-Time Applications", filed on May 30, 2014, whose inventors are Yan Yang, Hyeonkuk Jeong, Ming Jin, and Joe S. Abuan, which is hereby incorporated by reference in its entirety as if fully and completely set forth herein.

FIELD OF THE INVENTION

The present application relates to real-time applications, and more particularly to communication channel management for real-time applications executing on a mobile device.

DESCRIPTION OF THE RELATED ART

Wireless communication systems are rapidly growing in usage. Further, wireless communication technology has evolved from voice-only communications to also include the transmission of data, such as Internet and multimedia content. Some popular applications include videoconferencing (e.g., such as FaceTime™ from Apple) as well as media streaming. However, in many instances, the transmission of video content over a wireless communication channel such as Wireless LAN (WLAN) suffers from channel degradation issues. Therefore, improvements are desired in wireless communication.

SUMMARY OF THE INVENTION

Embodiments described herein relate to a method for conducting a real time application between a mobile device and a remote device. A first one or more messages (e.g., binding requests) may be transmitted to the remote device to establish a primary channel of communication for the real-time application. The primary channel may use a first radio access technology (RAT), such as WiFi or a cellular RAT. A second one or more messages (e.g., binding requests) may be transmitted to the remote device to establish a secondary channel of communication for the real-time application. The secondary channel may use a second RAT that is different from the first RAT. Data of the real-time application may be transmitted over both the primary channel and the secondary channel in a concurrent or redundant fashion.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

Figure 1:
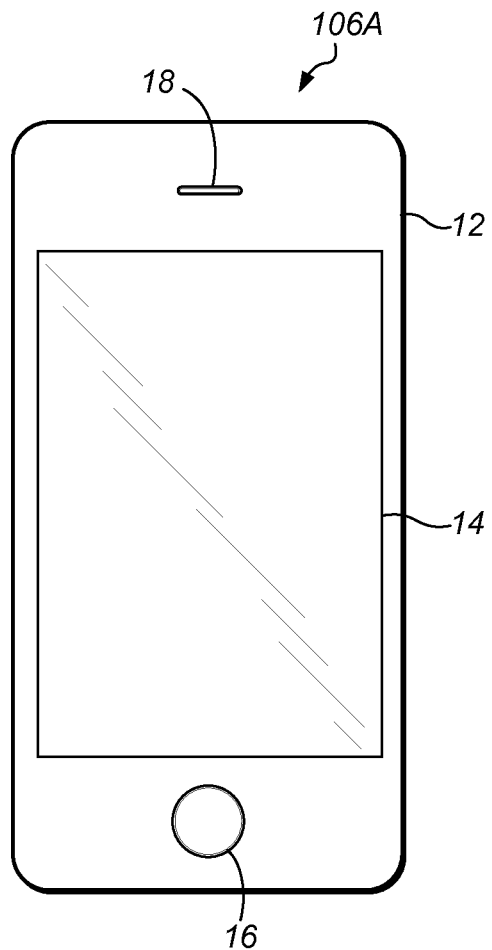
FIG. 1 illustrates an example mobile device, a smart phone, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present disclosure.
ICE: Interactive Connectivity Establishment
NAT: Network Address Translation
WiFi: Wireless Fidelity
WLAN: Wireless Local Area Network
LTE: Long Term Evolution
RAT: Radio Access Technology
TX: Transmit
RX: Receive Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Mobile Device—any of various types of computer systems devices which are mobile or portable and which performs wireless communications using both cellular communication and WLAN communication. Examples of mobile devices include mobile telephones or smart phones (e.g., iPhone™, Android™-based phones), and tablet computers such as iPad, Samsung Galaxy, etc. Various other types of devices would fall into this category if they include both cellular and WiFi communication capabilities, such as laptop computers (e.g., MacBook), portable gaming devices (e.g., Nintendo DS™, PlayStation Portable™, Gameboy Advance™, iPhone™), portable Internet devices, and other handheld devices, as well as wearable devices such as wrist-watches, headphones, pendants, earpieces, etc. In general, the term "mobile device" can be broadly defined to encompass any electronic, computing, and/or telecommunications device (or combination of devices) which is easily transported by a user and capable of wireless communication using both WLAN and cellular communication.

Cellular—The term "cellular" has the full breadth of its ordinary meaning, and at least includes a wireless communication network or RAT distributed over land areas called "cells" and is used by virtually all mobile telephones today.

Cellular RAT—The term "cellular RAT" has the full breadth of its ordinary meaning, and at least includes any of the present or future radio access technologies used to communication on a cellular network, such as Global System for Mobile Communications (GSM), Universal Mobile Telecommunications System (UMTS), Code Division Multiple Access (CDMA) (e.g., CDMA2000 1XRTT or other CDMA radio access technologies), Long Term Evolution (LTE), LTE Advanced, and other similar or future cellular RATs, including 3G, 4G, 5G, 6G, etc., cellular RATs.

Cellular Base Station—The term "Cellular Base Station" has the full breadth of its ordinary meaning, and at least includes a wireless cellular communication station installed at a fixed location and used to communicate as part of a cellular network or cellular radio access technology (RAT).

WiFi—The term "WiFi" has the full breadth of its ordinary meaning, and at least includes a wireless communication network or RAT that is serviced by wireless LAN (WLAN) access points and which provides connectivity through these access points to the Internet. Most modern WiFi networks (or WLAN networks) are based on IEEE 802.11 standards and are marketed under the name "WiFi". A WiFi (WLAN) network is different from a cellular network.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
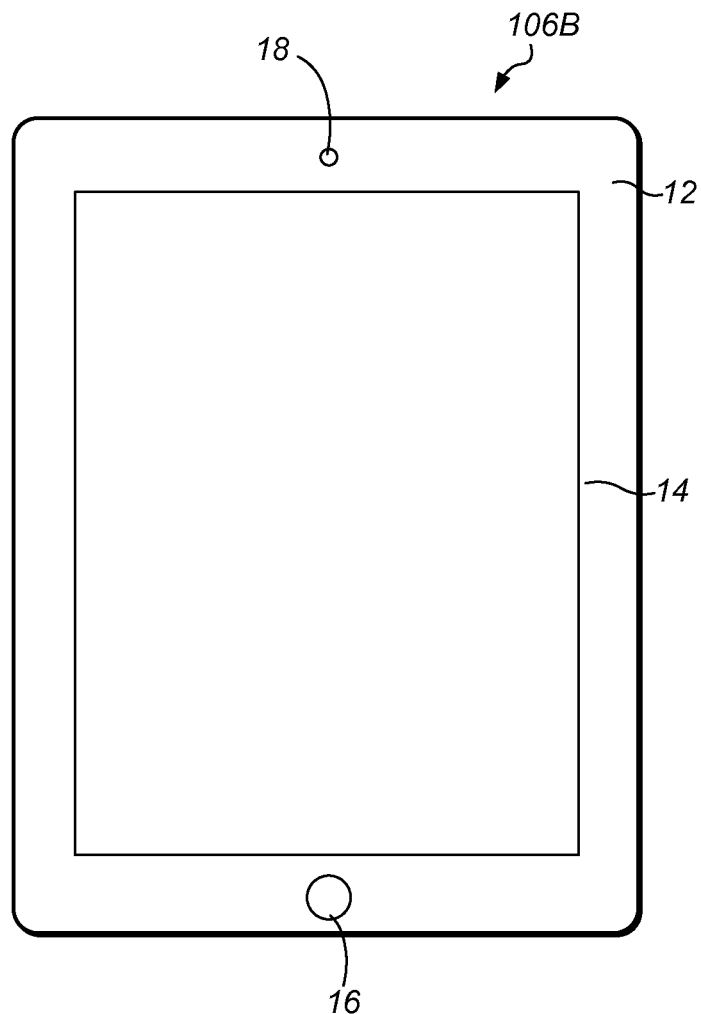
FIG. 2 illustrates another example mobile device, a table computer, according to one embodiment.

FIGS. 1 and 2—Mobile Device

FIG. 1 illustrates an example mobile device 106A according to one embodiment, in this case a telephone device, such as a smart phone. The term mobile device 106 may be any of various devices as defined above. FIG. 2 illustrates another example of mobile device 106B according to one embodiment, in this case a tablet device, such as a tablet computer, e.g., an iPad™, Samsung Galaxy™, and similar devices).

Mobile device 106 may include a housing 12 which may be constructed from any of various materials. Mobile device 106 may have a display 14, which may be a touch screen that incorporates capacitive touch electrodes. Display 14 may be based on any of various display technologies. The housing 12 of the mobile device 106 may contain or comprise openings for any of various elements, such as home button 16, speaker port 18, and other elements (not shown), such as microphone, data port, and possibly various other types of buttons, e.g., volume buttons, ringer button, etc.

The mobile device 106 may support multiple radio access technologies (RATs). For example, mobile device 106 may be configured to communicate using any of various cellular RATs. The mobile device 106 may also be configured to support at least one WiFi RAT, also known as Wireless LAN (WLAN). Various different or other RATs may be supported as desired.

The mobile device 106 may comprise one or more antennas. The mobile device 106 may also comprise any of various radio configurations, such as various combinations of one or more transmitter chains (TX chains) and one or more receiver chains (RX chains). For example, the mobile device 106 may comprise a radio that supports two or more RATs. The radio may comprise a single TX (transmit) chain and a single RX (receive) chain. Alternatively, the radio may comprise a single TX chain and two RX chains that operate on the same frequency. In another embodiment, the UE 106 comprises two or more radios, i.e., two or more TX/RX chains (two or more TX chains and two or more RX chains).

Figure 3:
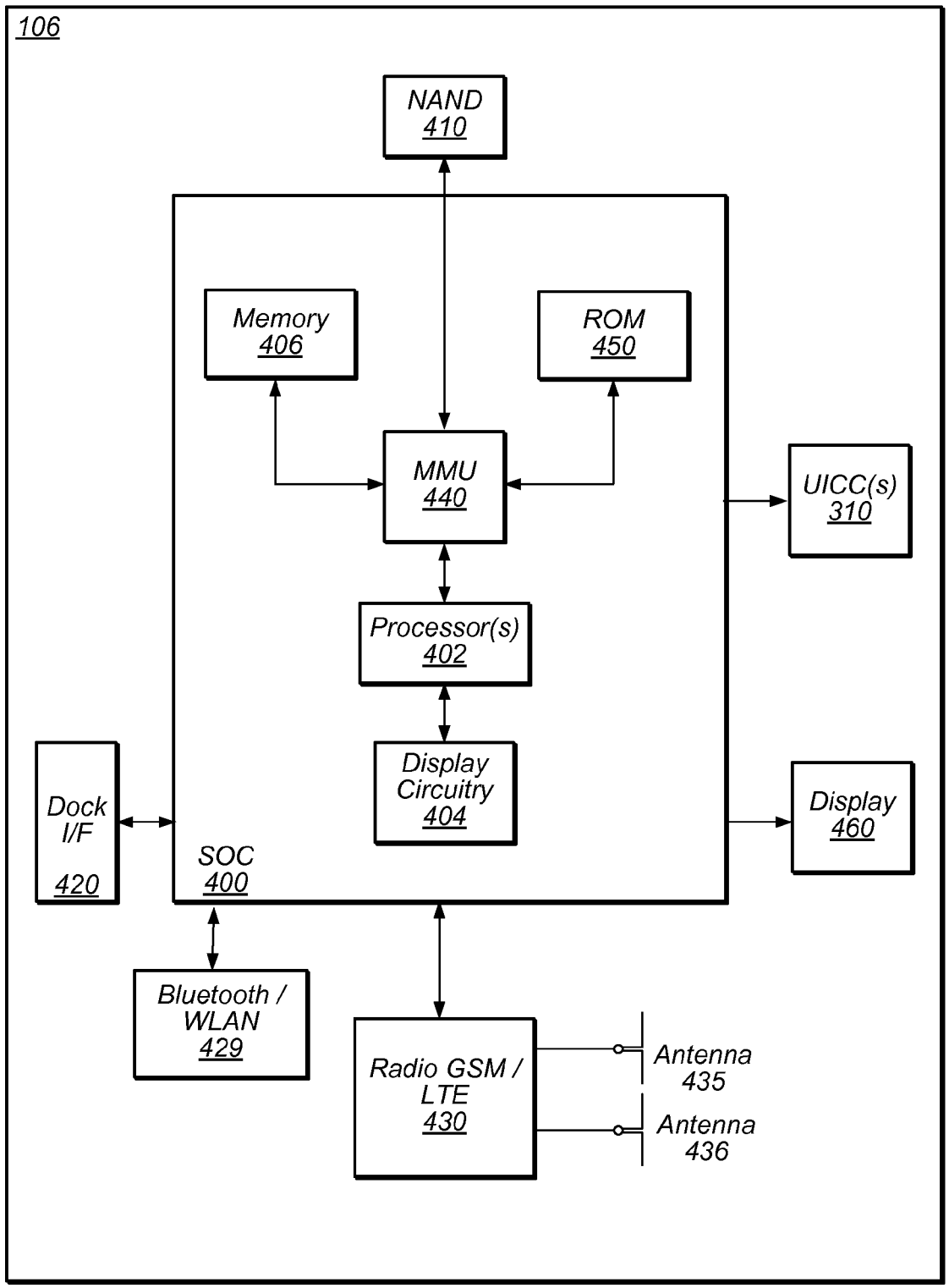
FIG. 3 is an example block diagram of a mobile device, according to one embodiment.

FIG. 3—Mobile Device Block Diagram

FIG. 3 illustrates an example simplified block diagram of a mobile device 106. As shown, the mobile device 106 may include a system on chip (SOC) 400, which may include portions for various purposes. The SOC 400 may be coupled to various other circuits of the mobile device 106. For example, the mobile device 106 may include various types of memory (e.g., including NAND flash 410), a connector interface 420 (e.g., for coupling to a computer system, dock, charging station, etc.), the display 460, cellular communication circuitry 430 such as for LTE, GSM, etc., and short range wireless communication circuitry 429 (e.g., Bluetooth™ and WLAN circuitry). The mobile device 106 may further comprise one or more smart cards 310 that comprise SIM (Subscriber Identity Module) functionality, such as one or more UICC(s) (Universal Integrated Circuit Card(s)) cards 310. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In one embodiment, as noted above, the mobile device 106 comprises at least one smart card 310, such as a UICC 310, which executes one or more Subscriber Identity Module (SIM) applications and/or otherwise implement SIM functionality. The at least one smart card 310 may be only a single smart card 310, or the UE 106 may comprise two or more smart cards 310. Each smart card 310 may be embedded, e.g., may be soldered onto a circuit board in the UE 106, or each smart card 310 may be implemented as a removable smart card, or any combination thereof. Any of various other SIM configurations are also contemplated.

As noted above, the mobile device 106 may be configured to communicate wirelessly using multiple radio access technologies (RATs). The mobile device 106 may be configured to communicate according to a WiFi RAT and/or one or more cellular RATs, e.g., such as communicating on both WiFi and cellular at the same time. For example, the mobile device 106 may be communicating on a primary communication channel (such as WiFi), and in response to detected degradation of the primary communication channel may establish a secondary communication channel (such as on cellular). The mobile device 106 may operate to dynamically establish and/or remove different primary and/or secondary communication channels as needed, e.g., to provide the best user experience while attempting to minimize cost.

As described herein, the mobile device 106 may include hardware and software components for implementing the above features for establishing, removing, and/or adjusting primary and secondary communication channels, as well as the various other techniques described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 4:
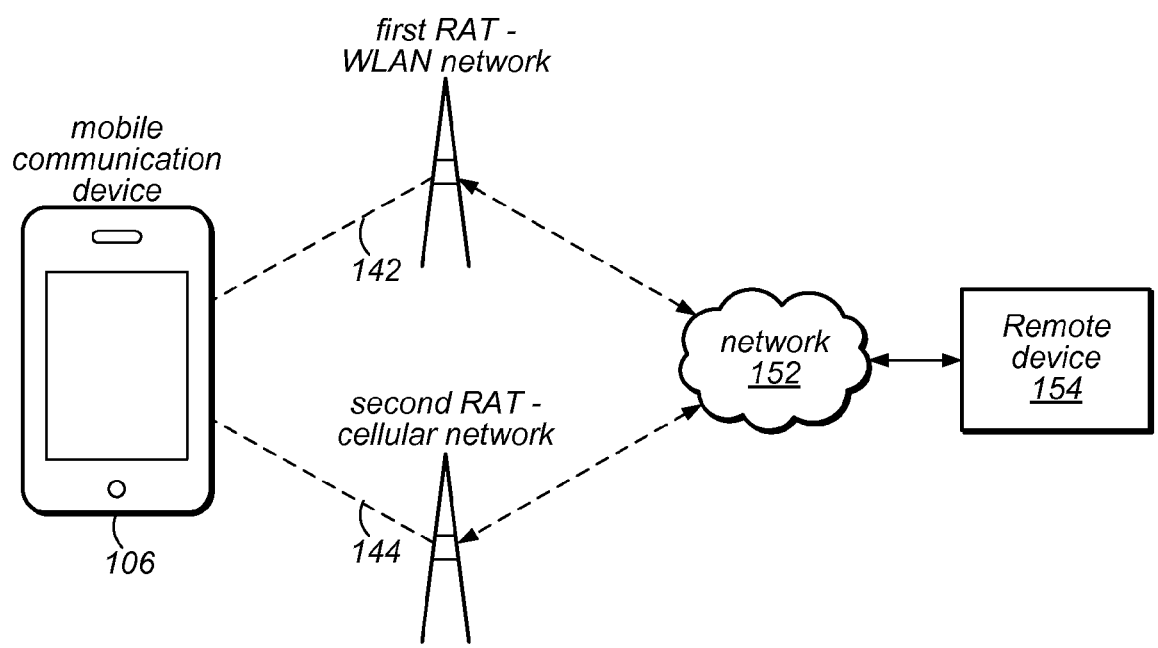
FIG. 4 illustrates an example wireless communication system where a mobile device communicates using two different channels associated with different RATs, respectively, according to one embodiment.

FIG. 4—Communication System

FIG. 4 illustrates an exemplary (and simplified) wireless communication scenario involving multiple communication systems. It is noted that the system of FIG. 4 is merely one example of a possible system, and embodiments may be implemented in any of various systems, as desired.

As shown, the exemplary wireless communication system includes a mobile device 106 communicating over a primary communication channel 142. In this example, the primary communication channel is a WiFi network RAT, whereby the mobile device 106 communicates through a WiFi access point as shown. The mobile device 106 may also establish a secondary communication channel 144, e.g., in response to channel conditions of the primary communication channel 142, as discussed in more detail below. In this example, the secondary communication channel is a cellular network RAT, whereby the mobile device 106 communicates through a cellular base station as shown. The mobile device 106 may communicate over one or both of the primary communication channel 142 and the secondary communication channel 144 to communicate with a remote device 154, which is also discussed in more detail below. Additionally, note that the RATs shown in FIG. 4 are exemplary only, and that other combinations are envisioned, such as using multiple different cellular RATs, e.g., instead of or in addition to the WiFi RAT.

Note that FIG. 4 only illustrates one side of the communication scenario, that is, the side from the mobile device 106 to the network 152 (e.g., the Internet). The remote device 154 may similarly have one or more paths to the network 152 from its point of view, e.g., including WiFi and/or cellular networks, as desired. In one embodiment, a "channel" may be considered any end-to-end communication path between the mobile device 106 and the remote device 154 (e.g., and may be characterized or specified by pairs of addresses, e.g., IP address and port number combinations for the mobile device 106 and the remote device 154). For example, a primary channel (e.g., the channel 142) may involve the mobile communication device 106 communicating via WiFi to network 152 and the remote device 154 communicating via its own WiFi to the network 152. The secondary channel (e.g., the channel 144) may involve the mobile communication device 106 communicating via a cellular RAT to the network 152 and the remote device 154 communicating via its own cellular RAT to the network 152. However, while these examples show a mirrored path on each side, the remote device 154 may use any RAT for each channel, as appropriate. For example, the remote device 154 may use WiFi communication for both the primary channel and the secondary channel. Alternatively, the remote device 154 may use a cellular RAT for the primary channel and WiFi for the secondary channel. In some embodiments, the "channel" may be at an application level, although other levels are also envisioned, such as lower levels.

Figure 5:
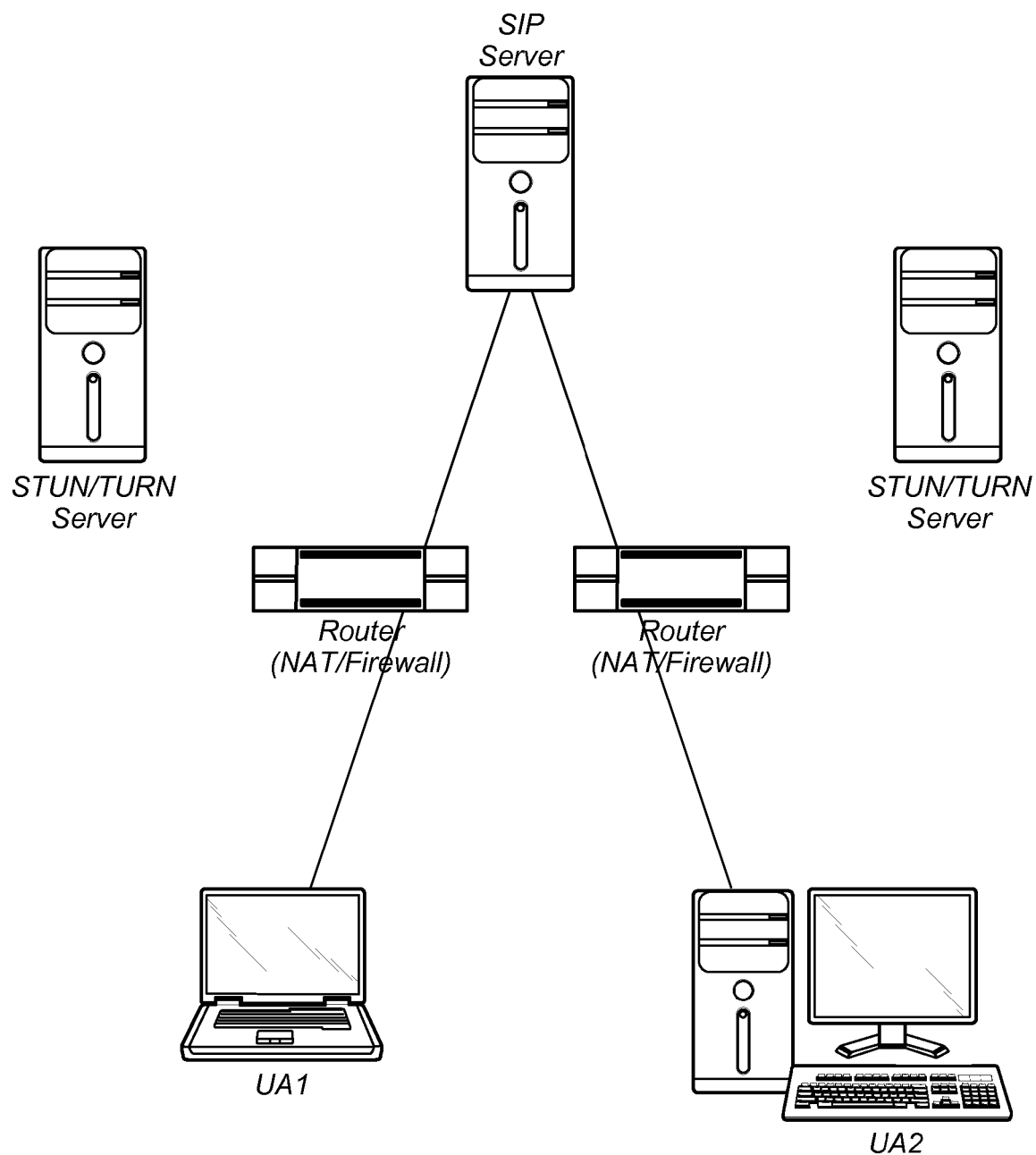
FIG. 5 illustrates a typical system where the Interactive Connectivity Establishment (ICE) protocol may be used.
Figure 6:
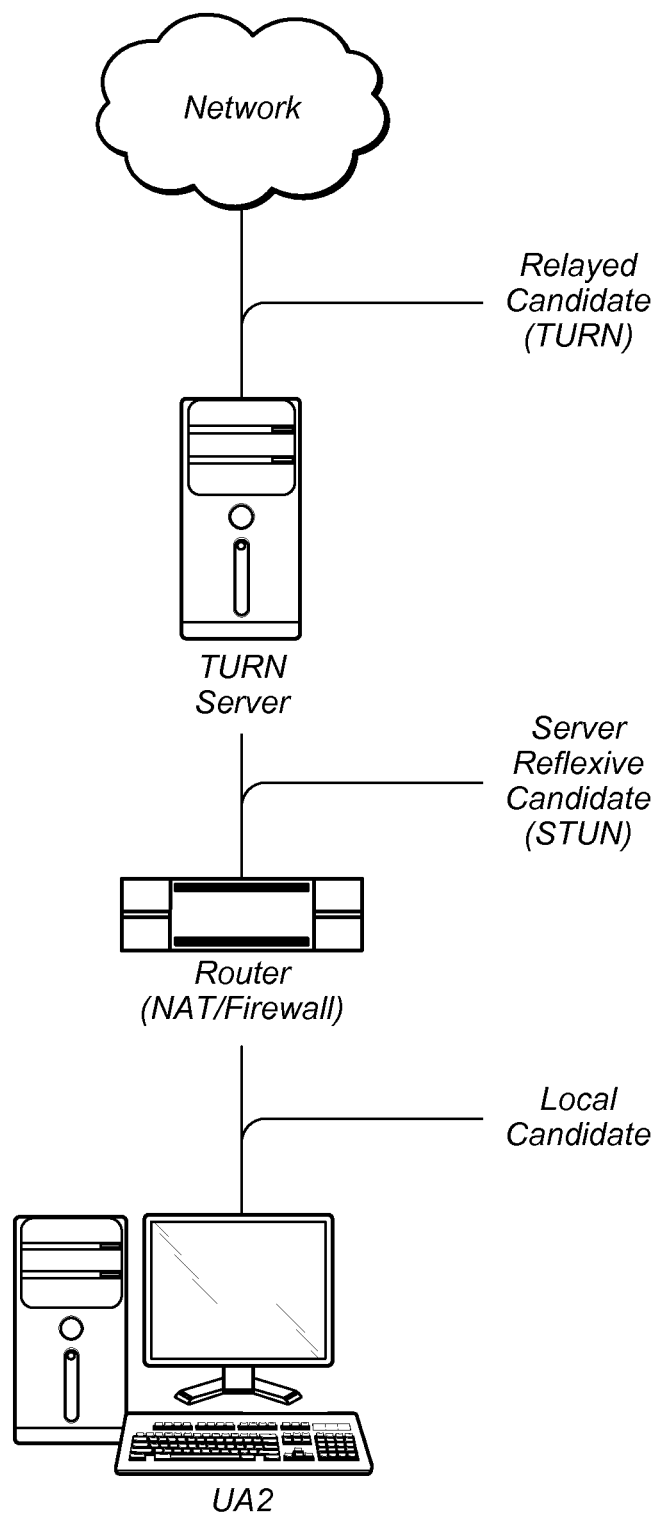
FIG. 6 illustrates the relationship of address candidates to a user equipment (UE) device.
Figure 7:
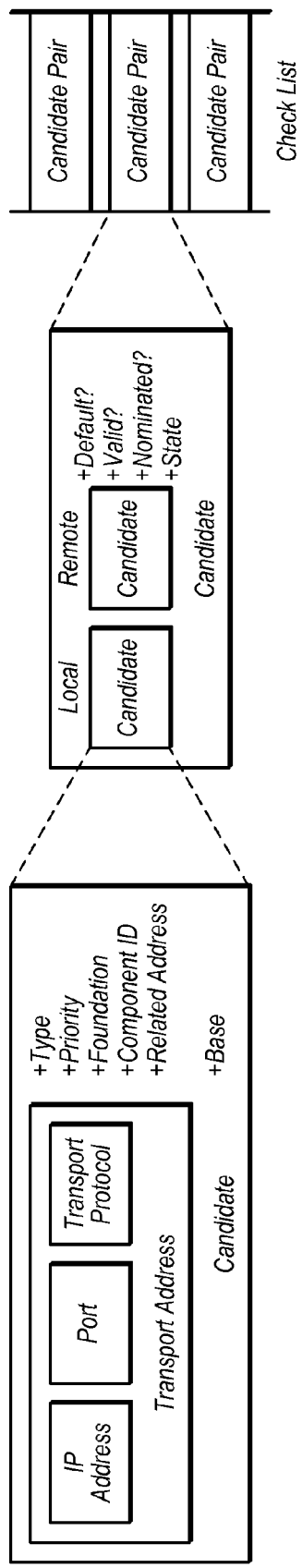
FIG. 7 illustrates the components of a candidate pair according to one embodiment.

FIGS. 5-7—Example ICE Protocol Operation

Real-time applications on mobile devices usually have multiple channels available to transmit and receive data packets. For instance, a mobile phone can have both cellular and WiFi connections available for communicating with a remote device. Due to the nature of radio technologies, each transmission channel may have different link characteristics, which in turn, may have different impacts on mobile device usage, e.g., power/battery life, cost/data allowance, etc. Therefore, real-time applications on mobile devices should attempt to select the best transmission channel to use under different scenarios.

In addition, as mentioned previously, some real-time applications on mobile devices suffer from a degraded transmission channel while performing real-time applications. The real-time applications may include bidirectional real-time applications such as conferencing or videoconferencing, or may include unidirectional applications, where the flow of traffic is almost solely in one direction (e.g., except for feedback channels or data regarding the application), such as audio or video streaming. As an example of channel degradation during a real-time application, a video conferencing session using WiFi can become unusable and may even be abruptly dropped when the WiFi signal degrades, which has a significant impact on the user experience of the real-time application. Therefore, it is important for real-time applications to minimize user impact caused by a degraded transmission channel. In order to address these and other issues, various embodiments may be implemented.

In one embodiment, the mobile device and remote device may perform channel selection using an Interactive Connectivity Establishment (ICE, RFC 5245) or similar algorithm. Background on Network Address Translation (NAT) and the ICE protocol is deemed appropriate.

In general, NAT is most often used in conjunction with IP masquerading, which is a technique that hides an entire IP address space, usually comprising private network IP addresses, behind a single IP address in a public address space. The NAT mechanism is usually implemented in a routing device that is positioned between the private and public IP address spaces. The routing device uses stateful translation tables to map the "hidden" private IP addresses into a single IP address and readdresses the outgoing Internet Protocol packets on exit so they appear to originate from the routing device. In the reverse communications path, responses are mapped back to the originating IP addresses using the rules ("state") stored in the translation tables.

The presence of Network Address Translation (NAT) presents problems for Voice over IP (VoIP) implementations. For example, two devices that each sit behind a NAT will only be able to exchange their private IP addresses and hence will not be able to communicate with each other. The ICE protocol is designed to facilitate or enable communication between two devices that reside behind Network Address Translation (NAT) routing devices. ICE allows two devices or user equipments (UEs), who are initially ignorant of their topologies, to discover enough topology information to find communication paths between them.

FIG. 5 illustrates a typical ICE deployment with two devices (UEs) communicating via a signaling protocol such as SIP, wherein the signaling protocol performs an offer/answer exchange of SDP (Session Description Protocol) messages. These two UEs are capable of exchanging SDP messages through an offer/answer exchange. The offer/answer exchange is used to set up media sessions between them through a SIP server. In addition, the ICE protocol uses STUN (Session Traversal Utility for NAT) and TURN (Traversal Using Relay NAT) servers to aid in facilitating connectivity between the devices. Each device can use its own STUN/TURN server, or they can use the same server.

ICE is an extension to the offer/answer model, and operates by including a plurality of IP addresses and ports in the SDP offers and answers, which are then tested for connectivity by peer-to-peer connectivity checks. Each of the UE devices in FIG. 5 has a list of transport addresses that can be used to communicate with another UE device. The ICE protocol is used to discover which addresses can connect to each other and the method used to make that connection through the NAT.

In order to execute the ICE protocol, the UEs may identify a plurality of address candidates and transport addresses. Transport addresses are a combination of IP address and port for a particular transport protocol. There are three types of candidates:

1. Host Candidate—transport address associated with a UE's local interface
2. Relayed Candidate—transport address associated with a TURN server (obtained from a TURN server)
3. Server Reflexive Candidate—translated address on the public side of the NAT (obtained from either a STUN server or a TURN server)

FIG. 6 shows the relationship of these candidates to the UE. After UE1 has gathered all of its candidates, it may arrange them in order of priority from highest to lowest and sends them to UE2 in attributes in an SDP offer message. UE2 performs a similar candidate gathering and sends a SDP response with its list of candidates. Each UE analyzes the two lists of candidates and pairs them up to make candidate pairs. Each UE gathers these into check lists and schedules connectivity checks, e.g., STUN request/response transaction, to see which pairs work. FIG. 7 shows an example of the components of the candidate pairs that make up the UE check list.

Figure 8:
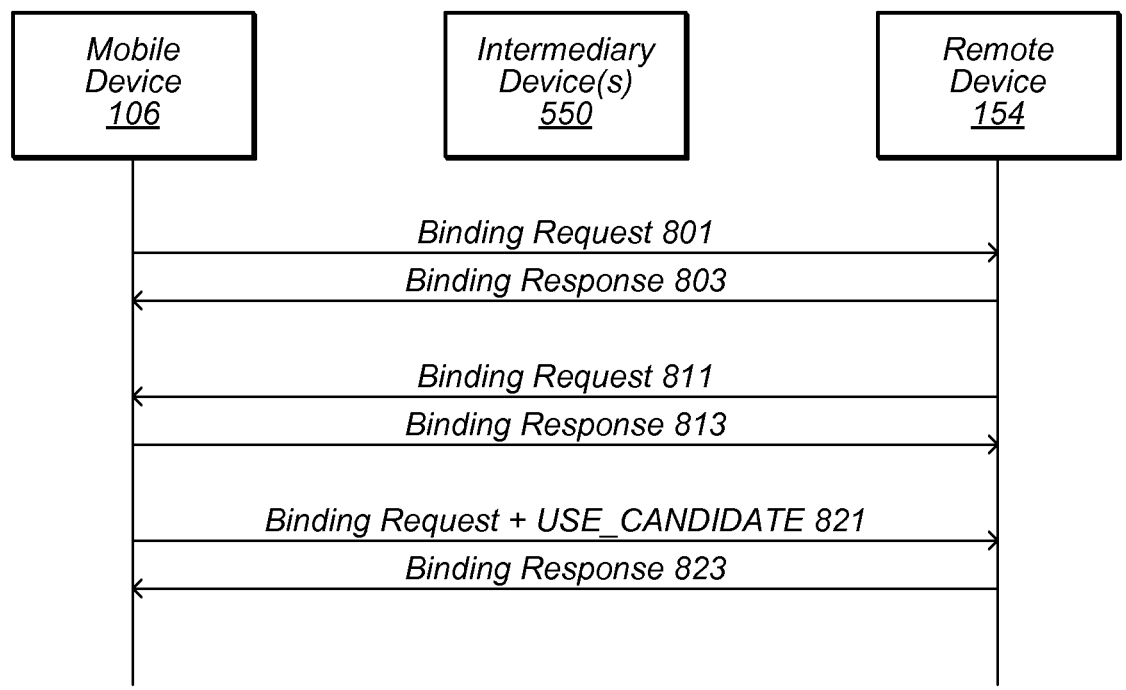
FIGS. 8-10 are message flow diagrams illustrating exemplary messages for establishing multiple channels for real-time applications.
Figure 9:
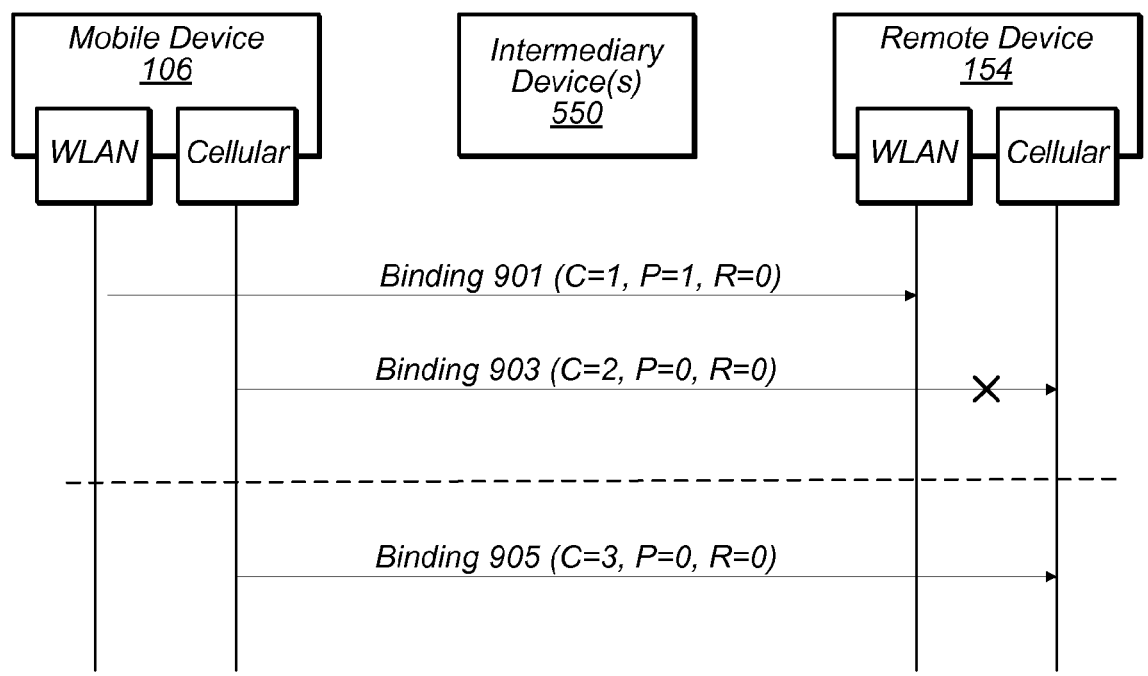
Figure 10:
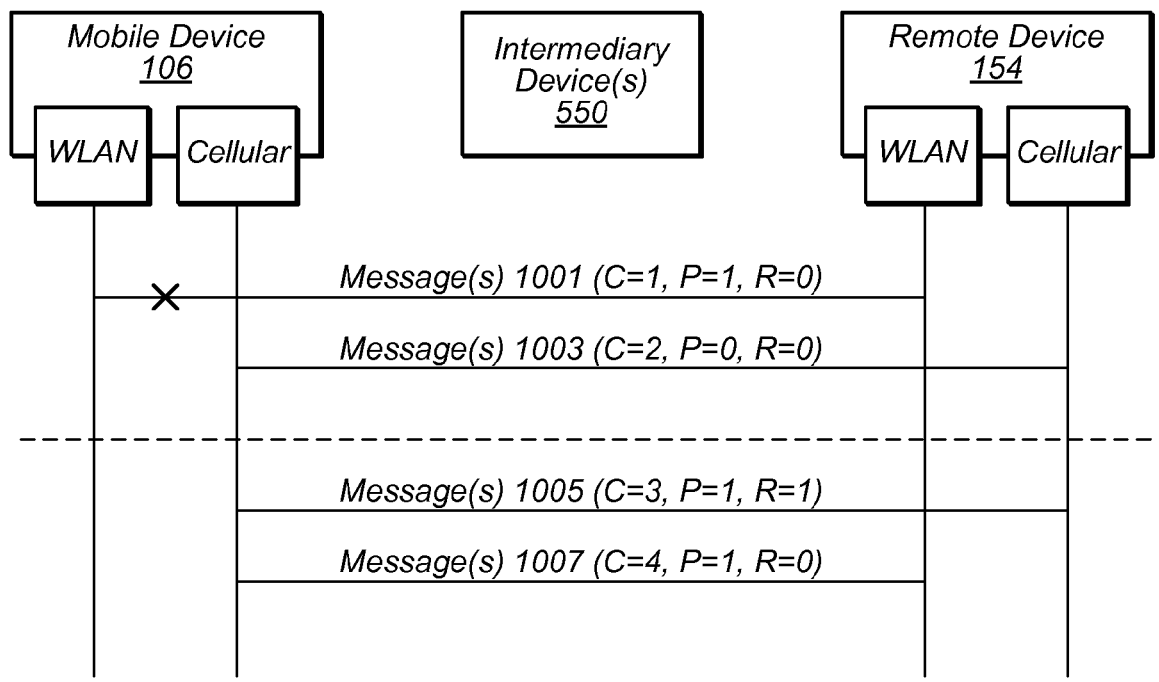

FIGS. 8-10: Establishing Multiple Channels for Real-Time Applications

In such a procedure, the mobile device and remote device may agree on a candidate pair, wherein a candidate pair defines a connection between two devices. The term "candidate pair" is used by ICE RFC 5245 and refers to the connectivity type at the local and remote ends of a single connection between two devices (e.g., one of WiFi, cellular, or other connectivity at the local side and one of WiFi, cellular or other connectivity at the remote side). This channel is used as a transmission channel for active data transmission for the real-time application.

FIG. 8 illustrates an exemplary message flow for selecting a channel or candidate pair. In particular, the mobile device 106 may communicate with the remote device 154, e.g., directly or via one or more intermediary device(s) 550, as shown. As shown, the mobile device 106 and the remote device 154 communicate using binding requests and binding responses for nomination purposes. These binding requests and binding responses may be referred to as nomination binding requests and nomination binding responses, where, for example, the term "nomination binding request" is a regular binding request with the "USE_CANDIDATE attribute. Nomination binding requests are specified in ICE RFC 5245. As shown in FIG. 8, in order to confirm that a candidate pair/channel is viable, the mobile device 106 may transmit a binding request 801 to the remote device 154. For example, if the channel specifies a WiFi address of the mobile device 106 and a WiFi address of the remote device 154, then the candidate pair may be WiFi/WiFi. The channel may or may not specify one or more intermediary devices 550, such as relay devices that may allow for NAT traversal (e.g., STUN or TURN server(s)). As another example, the channel may involve WiFi for the mobile device 106 and cellular (e.g., LTE) for the remote device 154, again with or without relay devices. Thus, in this example, the candidate pair may be WiFi/cellular.

If the initial binding request 801 from the mobile device 106 is successfully transmitted and received by the remote device 154, then the remote device 154 may transmit a binding response 803 to the mobile device 106. If this is successful, then the mobile device 106 may have confirmed the viability of the channel for the remote device 154. In some instances, in order for the remote device 154 to confirm viability, it may transmit its own binding request 811 to the mobile device 106 and receive a response 813 back.

A valid candidate pair refers to a candidate pair constructed by a UE device whose local candidate equals the destination address of the response, and whose remote candidate equals the destination address to which the request was sent. Once a candidate pair becomes valid, it may be evaluated to determine if it is better than other nominated pairs. This evaluation process may be based on many factors, such as connectivity type (P2P vs. Relay), link type (IPv4 vs. IPv6), RAT type (WiFi vs. cellular), user preference (e.g., WiFi preferred over cellular), etc. With respect to user preference, WiFi-WiFi may be preferred for primary channels, and cellular-cellular (or otherwise non-redundant pair) may be preferred for secondary channels, etc. Once a channel is selected from among other viable channels, it may be nominated for use as the primary transmission channel over which data may be transmitted for the real-time application. In order to select the channel, the mobile device 106 may send a binding request 821 with a USE_CANDIDATE flag for selection. The remote device 154 may confirm the selection by sending a corresponding binding response 823. Thus, FIG. 5 illustrates an exemplary message flow for nominating a channel for use in transmitting data in a real-time application.

As discussed above, there are situations where a channel used for communication in the real-time application may degrade or fail, which may result in a poor user experience. One method to handle this situation is to use more than one channel, e.g., to transmit data over a primary and secondary channel, e.g., in a redundant manner. The two channels may be used at all times, or may be selectively used in a dynamic fashion. As one example, a primary channel may be used alone until signs of degradation occur, and in response to the degradation, both the primary and secondary channel may be used to transmit the data (e.g., the same packets or content) in a redundant fashion. In some embodiments, both channels may be nominated or selected at a similar time or different times, as desired. For example, the secondary channel may be selected at the same time (or immediately or approximately after) as the primary channel. Alternatively, the secondary channel may be selected at a later time, e.g., in response to the primary channel degradation.

However, current ICE and similar algorithms only allow for a single channel to be used and do not support the use of multiple channels in a concurrent manner. Accordingly, embodiments described herein comprise additional parameters and message flows that may allow for the use of multiple channels. For example, additional parameters may include "count", "primary", and/or "replace" (e.g., which may be used as flags within the USE_CANDIDATE attribute shown in FIG. 8). For example, the "count" parameter may indicate the count of the message sent, e.g., so that the receiving device can ignore prior nomination requests, or more generally have context for the provided message. The "primary" parameter may indicate whether the nomination is for the primary channel or not (e.g., where a "1" value indicates that it is for the primary channel and a "0" indicates that it is for the secondary channel). The "replace" parameter may be used when replacing the current primary channel, e.g., but that the current secondary channel should remain the same.

It is noted that with different combinations of local and remote ICE candidates there can be $N^2$ possible connections. In one embodiment, the methods described herein are used to maintain only a primary channel and a secondary channel. This is primarily because two such channels are usually sufficient to achieve the desired quality of service, and the establishment and using of a greater number of channels does not provide sufficient benefit relative to the overhead involved.

FIGS. 9 and 10 provide examples corresponding to nominating and using multiple channels. In particular, FIGS. 9 and 10 illustrate messages that may be sent for different connection types as the channels evolve over time. In these Figures, the two connection types are WiFi and cellular, although any combinations of RATs are envisioned.

In FIG. 9, the WiFi-WiFi channel is initially selected as the primary channel. This selection may be performed in the manner shown in FIG. 8 (although other message flows and processors are envisioned). For example, the WiFi-WiFi binding request/response 901 of FIG. 9 may correspond to the binding request with USE_CANDIDATE attribute and follow-on binding response of FIG. 8. In one or more of the message(s) 901, the count flag is set to "1", indicating it is the first nomination in this sequence, the primary flag is set to "1", indicating that the message is for establishing the primary channel, and the replace flag is "0", indicating the message is not used for replacing the primary channel but leaving the secondary channel alone (it is essentially irrelevant for this message, as there is no current primary or secondary channel). Thus, message(s) 901 establish WiFi-WiFi as the primary channel between the mobile device 106 and the remote device 154 (this channel may or may not use intermediary device(s) 550, as desired. It is noted that in one embodiment evaluation of a better primary/secondary channel is always ongoing when there is an interface change.

The subsequent selection is for WiFi-cellular (that is, WiFi of the mobile device 106 and cellular for the remote device 154). In particular, in one or more of message(s) 903, the count flag is set to "2", indicating that it is the second nomination in this sequence, the primary flag is set to "0", indicating the message is for establishing the secondary channel, and the replace flag is "0", indicating the message does not replace the primary channel. Thus, after these messages 901 and 903, the primary and secondary channels are established for use by the real-time application. Note that they may or may not be used once they are established. For example, the secondary channel may only be used upon signs that the primary channel is degrading.

During the real-time application, the WiFi-cellular connection may degrade, fail, or otherwise need to be replaced, as indicated by the "x" shown in FIG. 9, e.g., which occurs after the dotted line shown in FIG. 9. For example, selection logic may determine that if WiFi-WiFi is used as the primary channel, it may be desirable to use cellular-cellular as the secondary channel (when available) since a WiFi failure for the mobile device 106 would cause a failure for both the primary and secondary channel otherwise. Accordingly, the cellular-cellular connection may be selected as the new secondary channel instead of the prior WiFi-cellular selection as the secondary channel using message(s) 905. In order to perform this selection, one or more of the message(s) 905 for cellular-cellular has a count of "3", indicating it is the third nomination of the sequence, a primary value of "0", indicating that the selection is for the secondary channel, and a replace value of "0", indicating that it does not replace the primary channel. Thus, FIG. 9 illustrates exemplary messages for establishing a primary and secondary channel and then replacing the secondary channel for a real-time application.

FIG. 10 provides an example where the mobile device 106 WiFi connection fails during the real-time application. Initially, the WiFi-WiFi pair is selected as the primary channel, in the same manner as FIG. 9, using message(s) 1001. The cellular-cellular pair is selected as the secondary channel using message(s) 1003, using a count value of "2", primary value of "0", and replace value of "0". Subsequently, the WiFi-WiFi connection fails (e.g., due to a drop or degradation of the mobile device 106 WiFi connection) as shown by the "x" in message(s) 1001 which may occur at the time of the dotted line shown in FIG. 10. Accordingly, the cellular-cellular secondary connection is upgraded to the primary channel by sending message(s) 1005, e.g., having at least one message with a count value of "3", indicating it is the third nomination, a primary value of "1", indicating it is for selection of the primary channel, and a replace value of "1", indicating it is replacing the previous primary channel. At this point, there is only one channel selected, which is the cellular-cellular channel. The other channel available is the cellular-WiFi channel, which may be selected as the primary or secondary channel, as desired. In one embodiment, the cellular-WiFi channel may be preferentially selected (e.g., assuming it meets quality of service thresholds) in order to avoid data use of the cellular connection of the remote device 154. Thus, the final message(s) 1007 in this sequence may be to use the cellular-WiFi as the primary channel, demoting the cellular-cellular to the secondary channel. This selection is performed using at least one message in the message(s) 1007 having a count value of "4", indicating it is the fourth nomination, a primary value of "1", indicating that it is selected for the primary channel, and a replace value of "0", indicating that the current primary channel (cellular-cellular) will become the new secondary channel, as opposed to maintaining a current secondary channel and removing the old primary channel if the value had been "1". Thus, after these messages, the cellular-WiFi channel is primary and the cellular-cellular is secondary. Alternatively, a message having a primary value of "0" and a replace value of "0" would have nominated the cellular-WiFi as the new secondary channel. Thus, FIG. 10 illustrates a process for modifying the primary and secondary channels in response to a connection failure for the mobile device 106.

Note that while the messages of FIGS. 9 and 10 are shown as being sent via WiFi or cellular, they may be sent in any desired manner. For example, while the message(s) 901 may be actually sent using the WiFi connections of the mobile device 106 and the remote device 154, they could also be sent via other connections, but pertain to the WiFi-WiFi candidate pair/channel.

In some embodiments, messages may be sent indicating when a connection or channel fails. For example, in the example of FIG. 10, a message may be sent indicating the failure of the WiFi-WiFi channel (or specifically, the WiFi connection of the mobile device 106). In some embodiments, such a message (e.g., or generally messages providing information about interfaces of the device) may be sent (e.g., pushed) via a side channel (e.g., a signal channel). However, such side channels may be slow or unreliable, and so may hinder the selection process discussed above. Accordingly, the mobile device 106 and/or remote device 154 may have logic that interprets the selection messages to identify that the previous channel has failed. For example, in FIG. 10, the message upgrading the secondary cellular-cellular channel as the primary channel may be interpreted by the remote device 154 as an indication that the WiFi-WiFi channel has failed. Thus, interpretation of the selection messages may be used to indicate interface changes (e.g., connection or channel failures or degradations).

As indicated above, in some embodiments, the channels may use relays (e.g., TURN and/or STUN servers, among other possibilities), such as when peer to peer communication is not possible. For example, during the nomination process, various different channels may be verified for each candidate pair (e.g., with and without relays). For example, when evaluating a WiFi-WiFi candidate pair, communication may be performed using one or more relay servers or in a peer to peer fashion. In one embodiment, both a peer to peer channel and a relay channel may be initially tested, since it may not be known whether a direct or peer to peer connection may be possible. In some embodiments, the peer to be peer channel and relay channel may be set up in the manner shown in FIG. 8, as desired. In one embodiment, if a direct channel is verified, the corresponding relay channel may not be necessary (e.g., since it may be preferable to use direct connections rather than relayed connections). However, the relay channel may be used in cases where the peer to peer channel is not available or does not meet quality of service thresholds. This relay procedure may be performed for both primary and secondary channels, as desired.

In one embodiment, setting up relay channels may operate by the sender selecting an interface (e.g., WiFi or cellular) and sending a relay initiation message to a relay service (e.g., to one or more relay servers). The receiver may also pick up or select its corresponding interface for the relay. In one embodiment, there may be minimal overhead for the relay server with a backup channel over relay.

In one embodiment, the relay may be set up for both the primary and the secondary channels. For example, a primary relay may be set up for the primary channel, where a candidate ID (e.g., a candidate identifier used in ICE) is used to identify the primary relay that corresponds to the primary channel. A secondary relay may also be set up for the secondary channel, where a different candidate ID is used to identify the secondary relay that corresponds to the secondary channel. Here a candidate ID is used to identify each relay and the respective channel to which it corresponds, although other types of identifiers may be used as well. Thus some mechanism is needed to identify which relays correspond to the primary and secondary channels. In general, the primary channel (and primary relay) will be established first, and the secondary relay may be set up at a later time. However, because relay set-up can be delayed, messages from the primary relay can interleave with messages from the secondary relay. Therefore a separate identifier may be used for each relay to identify which relays correspond to which channels.

In some embodiments, however, both the primary and secondary channels may be provided through the same relay service. For example, the relay may be used by the mobile device 106 regardless of the connection or channel. Similarly, the remote device 154 may also use the relay regardless of its connection or channel. The relay server may be configured to relay the information, regardless of the particular connection by which it came in.

In one embodiment, a table may be used for the primary and secondary channels, e.g., which may be negotiated or established prior to use of the channels. This table may be used for primary channels and secondary channels with and/or without relays, as desired. The table may be used when a connection fails or is disrupted. For example, if a WiFi-WiFi connection is present, then the table may indicate that the secondary channel is preferably cellular (e.g., for either the mobile device or the remote device). Similarly, if a WiFi-cellular connection is present, then the table may indicate that the secondary channel is preferably cellular. Thus, in some embodiments, the selection of primary and secondary channels, or fallbacks, may be selected in a pre-arranged fashion through use of a table or other data structure, as desired.

Figure 11:
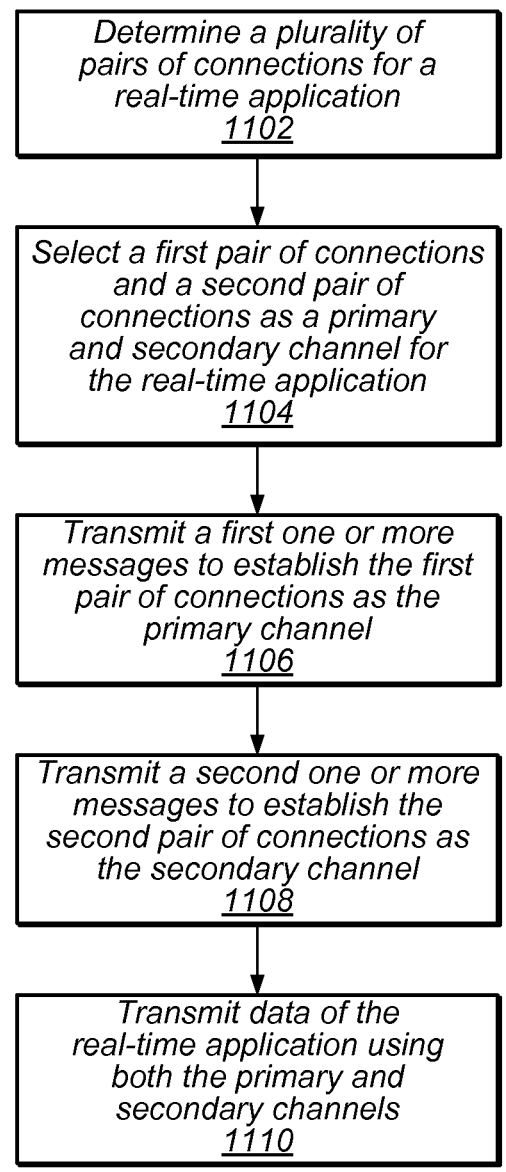
FIGS. 11 and 12 are flowchart diagrams illustrating exemplary methods for establishing multiple channels for real-time applications, according to some embodiments.

FIG. 11—Establishing Multiple Channels for Real-Time Applications

FIG. 11 is a flowchart diagram illustrating a method for establishing a primary and secondary channel for a real-time application. The method may be performed by a mobile device (such as mobile device 106) communicating with a remote device (such as remote device 154) and the first and second channels may use two different RATs (e.g., WiFi and LTE, although other combinations are envisioned). The method shown in FIG. 11 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 1102, a plurality of pairs of connections may be determined for potential channels for the real-time application. In particular, the mobile device and the remote device may determine which pairs of connections are viable, e.g., using the message flow shown in FIG. 8. For example, the mobile device may be able to use WiFi or cellular connections to communicate with the remote device (e.g., with or without relay devices). Similarly, the remote device may be able to use its own WiFi or cellular connections to communicate with the mobile device (e.g., with or without relay devices). Accordingly, pairs of connections may include WiFi-WiFi, WiFi-cellular, cellular-WiFi, and cellular-cellular. In addition, there may be a plurality of IP addresses and/or port combinations associated with each of the types of connections (e.g., via using relays or different ports for each connection). For example, one candidate pair WiFi-WiFi may use a first port and IP address combination for the mobile device while a second candidate pair (still WiFi-WiFi) may use a different port and IP address combination for the mobile device.

In 1104, a first pair of connections and a second pair of connections may be determined as primary and secondary channels for the real-time application. In particular, the plurality of pairs of connections may be tested for viability, e.g., by sending messages between the mobile device and the remote device, e.g., in the manner discussed above regarding FIG. 8. Once the plurality of pairs have been trimmed to a plurality of viable pairs, ranking logic may be used to rank the candidate pairs. The ranking logic may take into account various criteria, such as preferentially using WiFi or connection types that do not have data fees associated therewith (e.g., avoiding cellular), quality of service parameters, favoring peer-to-peer or direct pairs rather than relayed pairs, IPv4 versus IPv6, favoring local connections versus Internet connections, where possible, etc. After ranking these choices, the highest ranking pair may be selected as the primary channel.

In some embodiments, the second highest pair may be selected as the secondary channel. However, it is also possible that the ranking of the remaining sets of pairs may be influenced by the selection of the primary channel. For example, if the primary channel is WiFi-WiFi and the next two ranking pairs are WiFi-cellular and cellular-cellular, the cellular-cellular pair may be selected over the WiFi-cellular for the secondary channel in order to reduce reliance on the WiFi connection for both channels, or said another way, to increase robustness of the primary and secondary channels. Similarly, for cellular-cellular as the primary channel, a WiFi-WiFi candidate pair may be generally preferred over a cellular-WiFi or WiFi-cellular pair as the secondary channel. For WiFi-cellular as the primary, cellular-WiFi may be preferred over WiFi-WiFi or cellular-cellular as the secondary. However, these preferences may be overwhelmed by other factors, such as quality of service thresholds or other criteria.

In 1106, a first one or more messages may be transmitted to establish the first pair of connections as the primary channel. For example, the one or more messages may include transmitting a binding request with USE_CANDIDATE from the mobile device to the remote device. In response, the remote device may send a binding response to verify establishment of the primary channel. As discussed above, the one or more messages (e.g., the request from the mobile device) may use one or more of the "count", "primary", and "replace" parameters discussed above. In this case, for example, the request may include a primary parameter having a value of "1".

In 1108, a second one or more messages may be transmitted to establish the second pair of connections as the secondary channel. For example, the one or more messages may include transmitting a binding request with USE_CANDIDATE from the mobile device to the remote device. In response, the remote device may send a binding response to verify establishment of the primary channel. As discussed above, the one or more messages (e.g., the request from the mobile device) may use one or more of the "count", "primary", and "replacement" parameters discussed above. In this case, for example, the request may include a primary parameter having a value of "0".

In 1110, data of the real-time application may be transmitted using both the primary and the secondary channel. In one embodiment, the secondary channel may only be used in response to degradation (e.g., but not failure) of the primary channel. For example, the same data may sent redundantly over both the primary and secondary channels in response to deterioration of the primary channel. For example, the same packets may be sent concurrently over both channels. Alternatively, or additionally, the same content may be sent concurrently over both channels (e.g., but potentially in different formats, e.g., based on the RATs or candidate pairs being used).

In addition to establishing the primary and secondary channels, the method may also involve setting new pairs of connections as the primary and/or secondary channel. For example, one of the connections may fail, a better connection may come available (e.g., as one of the users gains access to WiFi), or connection characteristics of the various available pairs may change. In response to such events, it may be necessary to change the primary and/or secondary channels. Accordingly, messages may be sent, similar to the ones above, to establish such channels. These messages may also make use of the "count", "primary", and "replace" parameters, e.g., in the manner discussed above regarding FIGS. 9 and 10.

In one embodiment, using two channels for the real-time application may mean that substantially all packets (e.g., all audio and/or video packets) of the real-time application are transmitted over both the primary communication channel and the secondary communication channel. For example, in a videoconferencing application, the mobile device may transmit the same packets (e.g., comprising audio and/or video information of the videoconference) over both the primary communication channel and the secondary communication channel. As another possibility, the mobile device may encode the packets differently for each channel (e.g., where the audio and/or video packets are encoded according to a different codec, bit rate, and/or resolution), but the same audio and video information (albeit in different formats) is transmitted over both channels. Thus, the two channels may be used for redundant transmission in either an identical sense (i.e., the same packets are sent) or in a content sense (i.e., the same content is sent, but potentially in a different format). Thus, in either embodiment, in 508, the packets of the real-time application may be transmitted concurrently over the two channels, in a redundant fashion. Accordingly, in some embodiments, the secondary channel may be referred to as a redundant channel.

The method of FIG. 11 may also be extended to apply to more than two channels, as desired.

Figure 12:
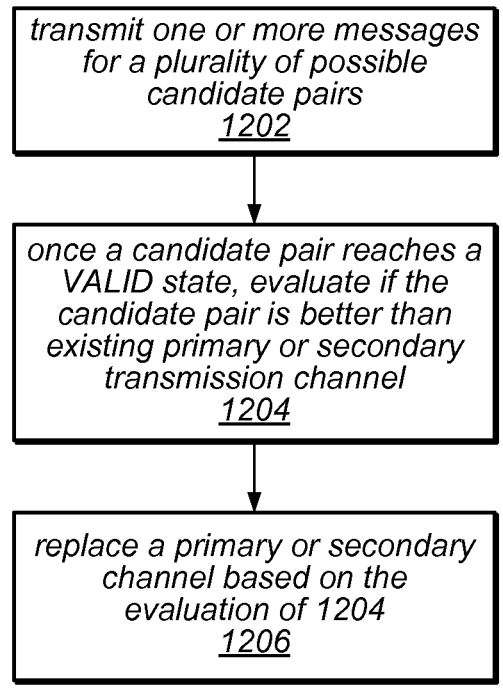

FIG. 12—Establishing Multiple Channels for Real-Time Applications

FIG. 12 is a flowchart diagram illustrating a method for establishing a primary and secondary channel for a real-time application. The method of FIG. 12 may describe one specific implementation of the method of FIG. 11 or an alternative embodiment to the method of FIG. 11, as desired. The method may be performed by a mobile device (such as mobile device 106) communicating with a remote device (such as remote device 154) and the first and second channels may use two different RATs (e.g., WiFi and LTE, although other combinations are envisioned). The method shown in FIG. 12 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 1202, one or more messages may be transmitted for a plurality of possible candidate pairs (e.g., all possible candidate pairs). For example, messages may be transmitted for WLAN-WLAN, WLAN-cellular, cellular-WLAN, cellular-cellular, etc. In one embodiment, the messages may be ICE check messages (e.g., Binding Request/Response messages).

In 1204, once a candidate pair reaches VALID state, the UE may evaluate if this candidate pair is better than an existing primary or secondary transmission channel. The "VALID" state may be determined by the local candidate sending/receiving a Binding Request/Response and/or the remote candidate sending/receiving a Binding Request/Response).

In 1206, if the UE's evaluation process selects the candidate pair of 1204 as a new primary or secondary transmission channel, it may use one or more of the processes described earlier to replace the current primary or secondary transmission channel, depending on the evaluation of 1204.

This evaluation and selection process may be repeated whenever there is a new candidate pair reaches VALID state. In some embodiments, the method of FIG. 12 may be used for establishing or replacing channels for real-time applications. In particular, in one embodiment, any discussions of establishing or replacing channels herein may use the method of FIG. 12. However, other methods or variations are envisioned.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a mobile device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for conducting a real time application between a mobile device and a remote device, the method comprising:
   at the mobile device:
      transmitting a first one or more messages to the remote device to establish a primary channel of communication for the real-time application, wherein the primary channel uses a first radio access technology (RAT);
      transmitting a second one or more messages to the remote device to establish a secondary channel of communication for the real-time application, wherein the secondary channel uses a second RAT that is different from the first RAT;
      transmitting data of the real-time application over both the primary channel and the secondary channel, wherein said transmitting the data of the real-time application comprises transmitting data packets of the real time-application over the primary channel and concurrently transmitting the data packets of the real-time application over the secondary channel.

2. The method of claim 1, wherein said transmitting the data of the real-time application over both the primary and the secondary channel is performed in response to degradation of the primary channel.

3. The method of claim 1, wherein the first and second one or more messages comprise one or more of a count parameter, a primary parameter, and a replace parameter.

4. The method of claim 1, wherein the first and second one or more messages comprise a count attribute, a primary attribute, and a replacement attribute.

5. The method of claim 1, wherein the first and second one or more message comprise interactive connectivity establishment (ICE) messages.

6. The method of claim 1, wherein the first one or more messages establish a relay for communication between the mobile device and the remote device.

7. The method of claim 1, wherein the first RAT comprises Wireless LAN (local area network) and wherein the second RAT comprises a cellular RAT.

8. The method of claim 1, wherein the primary channel comprises a first candidate pair, wherein the method further comprises:
selecting the first candidate pair as the primary channel from among a plurality of possible candidate pairs.

9. The method of claim 1, wherein the primary channel comprises a first candidate pair, wherein the secondary channel comprises a second candidate pair, and wherein the method further comprises:
verifying communication of the first candidate pair and the second candidate pair prior to establishing the primary and secondary channels.

10. The method of claim 1, wherein the real-time application comprises a videoconferencing application.

11. A mobile device configured to perform a real-time application, wherein the real-time application communicates audio/video packets with a remote device, the mobile device comprising:
at least one antenna;
at least one radio, wherein the at least one radio is configured to perform communication using a primary channel and a secondary channel; and
one or more processors coupled to the at least one radio, wherein the one or more processors and the at least one radio are configured to:
determine a plurality of pairs of connections between the mobile device and the remote device;
select a first pair of connections as the primary channel and a second pair of connections as the secondary channel for the real-time application;
transmit a first one or more messages to the remote device to establish the primary channel of communication for the real-time application, wherein the primary channel uses a first radio access technology (RAT);
transmit a second one or more messages to the remote device to establish a secondary channel of communication for the real-time application, wherein the secondary channel uses a second RAT that is different from the first RAT;
transmit data of the real-time application over both the primary channel and the secondary channel, wherein transmitting data of the real-time application over both the primary channel and the secondary channel comprises transmitting the same data over both the primary channel and the secondary channel.

12. The mobile device of claim 11, wherein said transmitting the data of the real-time application over both the primary and the secondary channel is performed in response to degradation of the primary channel.

13. The mobile device of claim 11, wherein the first one or more messages comprise a count parameter having a first number, and wherein the second one or more messages comprise a count parameter having a second, later number.

14. The mobile device of claim 11, wherein the first one or more messages comprise a primary parameter having a first value for indicating establishment of the primary channel, and wherein the second one or more messages comprise a primary parameter having a second value for indicating establishment of the secondary channel.

15. The mobile device of claim 11, wherein the one or more processors are further configured to:
determine the primary channel is no longer viable; and
transmit a third one or more messages to the remote device to establish a new primary channel.

16. The mobile device of claim 15, wherein the third one or more messages specify the secondary pair of connections as the primary channel.

17. The mobile device of claim 15, wherein the third one or more message specify a third pair of connections as the primary channel.

18. The mobile device of claim 17, wherein the third one or more messages comprise a replace parameter having a value indicating that the secondary channel is unchanged.

19. A non-transitory, computer accessible memory medium storing program instructions for conducting a real time application between a mobile device and a remote device, wherein the program instructions are executable by a processor to:
transmit a first one or more messages to the remote device to establish a primary channel of communication for the real-time application, wherein the primary channel uses a first radio access technology (RAT);
transmit a second one or more messages to the remote device to establish a secondary channel of communication for the real-time application, wherein the secondary channel uses a second RAT that is different from the first RAT;
transmit data of the real-time application over both the primary channel and the secondary channel, wherein transmitting data of the real-time application over both the primary channel and the secondary channel comprises transmitting the same content over both the primary channel and the secondary channel.

* * * * *